United States Patent [19]
Luneau

[11] Patent Number: 6,038,443
[45] Date of Patent: *Mar. 14, 2000

[54] CALLING PARTY ANNOUNCEMENT APPARATUS

[76] Inventor: David J. Luneau, 274 Gage Hill Rd., Hopkinton, N.H. 03229

[*] Notice: This patent is subject to a terminal disclaimer.

[21] Appl. No.: 08/660,814

[22] Filed: Jun. 10, 1996

Related U.S. Application Data

[63] Continuation-in-part of application No. 08/303,534, Sep. 9, 1994, Pat. No. 5,526,406, and a continuation-in-part of application No. 07/827,262, Jan. 29, 1992, abandoned.

[51] Int. Cl.[7] .................................................. H04M 11/00
[52] U.S. Cl. ........................ 455/415; 379/88.21; 379/142
[58] Field of Search .................................... 379/142, 265, 379/67, 88, 88.19, 88.2, 88.21, 88.22, 88.23, 88.24; 455/415, 414, 38.2, 459

[56] References Cited

U.S. PATENT DOCUMENTS

| | | | |
|---|---|---|---|
| 4,899,358 | 2/1990 | Blakely | 379/67 |
| 4,924,496 | 5/1990 | Figa et al. | 379/142 |
| 5,452,346 | 9/1995 | Miyamoto | 379/142 |
| 5,467,385 | 11/1995 | Reuben et al. | 379/88 |
| 5,481,594 | 1/1996 | Shen et al. | 379/142 |
| 5,511,111 | 4/1996 | Serbercioglu et al. | 455/414 |
| 5,546,448 | 8/1996 | Caswell et al. | 379/88 |

Primary Examiner—Lee Nguyen
Attorney, Agent, or Firm—Michael J. Persson; William B. Ritchie

[57] ABSTRACT

A calling party announcement apparatus that provides the identity of the caller in synthesized human speech. The invention captures the Incoming Caller Line Identification (ICLID) signal sent by the telephone company. The invention announces the calling party's identity to the called party through a built-in speaker and over the telephone receiver. The called party can elect to accept or reject the call before the telephone company central office has connected the two parties together. The invention makes it possible to screen incoming telephone calls without the aid of a special Caller ID telephone set or auxiliary Caller ID display terminal. The invention is installed in the customer premises, such as a residence or office, between the telephone line demarcation point and the telephone sets. The invention is compatible with any standard telephone set and subscriber trunks provisioned with the Caller ID enhanced customer feature. One of the most important features of the invention is its ability to deliver a vocalized announcement of the caller's identity over a standard telephone set's receiver without the call having actually been declared answered by the telephone company, and without the caller having been cut through. The call is not considered "answered" nor is it billed by the telephone company unless the called party or a telephone answering device, such as an answering machine, accepts the call.

14 Claims, 6 Drawing Sheets

CALLING PARTY ANNOUNCEMENT APPARATUS

This application is a Continuation-In-Part of U.S. patent application Ser. No. 08/303,534, filed Sep. 9, 1994 now U.S. Pat. No. 5,526,406, and U.S. patent application Ser. No. 07/827,262, filed Jan. 29, 1992, now abandoned.

BACKGROUND OF THE INVENTION

1. Field of the Invention

The invention relates to an apparatus that identifies incoming telephone calls and allows the called party to accept or reject the call before the telephone company has connected the two parties together.

2. Description of the Related Art

Changes in the North American telephone network have opened the door to new services available to business and residential customers. In particular, CLASS (Caller ID, Return Call, Call Block, Repeat Call, Priority Call, and Select Forward) services have been made possible, in part, by the deployment of a common channel interoffice signaling system called SS7. This signaling system brings information about the call to points in the telephone network not previously available. For example, the identity of the calling party is made available, electronically, to the called party.

The Caller ID feature particularly promises a series of novel and useful benefits to the telephone subscriber. The telephone number of the calling party is made available such that it can be presented to the called party. Of particular note is the fact that the data representing the calling party number is transmitted before the called party has answered, officially completing the connection.

To date, the majority of subscriber owned and provided devices used to receive and interpret the data containing the calling party's number make use of some sort of visual display to convey the information to the user. Some devices do not display the data but make it available in a form which can be accepted by a personal computer.

In U.S. Pat. No. 4,582,956, issued Apr. 15, 1986 to Carolyn A. Doughty, a method is disclosed to display special information about a call, such as the calling party's telephone number. The method does not provide means for vocalized announcement of the number or association with any other information about the caller.

In U.S. Pat. No. 4,924,496, issued May 8, 1990 to Romek Figa, an incoming call number display is described that permits the called party to view the name or number of the caller. Although the invention provides means to associate the caller's number with a name, it does not provide means for vocalized announcement.

In U.S. Pat. No. 5,054,055, issued Oct. 1, 1991 to John P. Hanle, a system is disclosed to pass the calling party's number sent by the telephone office to a computer system. While common hardware and software components are available to announce the caller's identity, provision is not made for announcement over the answered telephone set, nor is it an object of such to implement a call announcement apparatus.

In U.S. Pat. No. 4,720,848, issued Jan. 19, 1988 to Tadahiko Akiyama, a system is disclosed to render information about an incoming call. While vocalized announcement is achieved over the telephone set, a special telephone office switch or private branch exchange (PBX) is necessary. Similar implementations are disclosed in U.S. Pat. No. 4,899,358, issued Feb. 6, 1990, and U.S. Pat. No. 5,007,076, issued Apr. 9, 1991, both to James R. Blakely. Such implementations provide all vocalized announcement means via apparatus located at the telephone office switch or PBX, and are not designed as small business or residential premise equipment on trunks provisioned with the Caller ID enhanced service feature.

A variety of products are available that do not utilize the Caller ID enhanced service feature but instead screen incoming calls by querying the caller for a name or number after the telephone connection has been established. U.S. Pat. No. 4,304,968, issued Dec. 8, 1981 to Klausner et al, discloses such an apparatus that answers the incoming telephone call and directs the caller to enter his or her telephone number using the telephone set tone keypad. Next, the device performs a search through a database of callers before ringing the premise extensions and announcing the caller's name. Such a device not only requires cooperation from the calling party to enter the telephone number but may result in a billed toll call since the call has actually been answered.

There is not found in the prior art a single-line customer premise apparatus that transmits the name or number of the calling party audibly through a speaker, and via the telephone itself. In prior art devices which provide a visual display, the subscriber must be within viewing distance, and the subscriber must purchase and install units for each extension telephone. A caller ID apparatus that can serve all telephones on the premises as well as being used with cordless telephones and "speaker" phones is not found, nor is there available that meets the requirements mentioned herein that is compatible with the "Caller ID" and "Caller ID with Call Waiting" enhanced service features available from a growing number of telephone companies.

SUMMARY OF THE INVENTION

It is an aspect of the invention to provide a calling party announcement apparatus that audibly identifies the calling party to the called party over the telephone set.

It is also an aspect of the invention to provide a calling party announcement apparatus that audibly identifies the calling party to the called party over a speaker.

It is also an aspect of the invention to audibly identify the calling party to the called party prior to the telephone company delivering the call.

It is another aspect of the invention to receive the Incoming Call Line Identification (ICLID) signal and announces the caller's telephone number based on the contents of such signal.

It is another aspect of the invention to receive the ICLID signal and announces the name of the caller based on a database reference to the caller's telephone number contained in such signal.

It is another aspect of the invention to receive the ICLID signal and announces the name of the state where the call originates based on a database reference to the caller's area code contained in such signal.

It is another aspect of the invention to audibly identify the calling party to the called party on lines provisioned with Caller ID with Call Waiting.

It is another aspect of the invention to operate in a manner whereby the calling party is unaware is installed.

It is another aspect of the invention to provide audible Caller ID delivery over any or all telephone sets sharing the same telephone line.

It is another aspect of the invention to extend the Caller ID service to visually impaired subscribers.

It is another aspect of the invention to provide a calling party announcement apparatus that can be centrally located in the subscriber's premises.

It is another aspect of the invention to provide a calling party announcement apparatus that does not lead to fewer call completions and works with auto-answering devices such as answering machines, modems, and faxes.

It is another aspect of the invention to provide a calling party announcement apparatus that works with cordless and speaker telephone sets.

It is another aspect of the invention to provide a calling party announcement apparatus that is easy to install in a home or office with little knowledge of telephone wiring.

It is another aspect of the invention to provide a calling party announcement apparatus that will not interfere with outbound calling, emergency calls, call waiting, or other special telephone subscriber services.

It is another aspect of the invention to provide a calling party announcement apparatus that will block unwanted calls.

It is another aspect of the invention to provide a calling party announcement apparatus that displays the local date and time.

It is another aspect of the invention to provide a calling party announcement apparatus that displays the name and telephone number of incoming telephone calls.

It is another aspect of the invention to provide a calling party announcement apparatus that provides a log book of incoming calls.

It is another aspect of the invention to provide a calling party announcement apparatus that will not require special provisions at the telephone central office for name database access or announcement apparatus.

It is another aspect of the invention to provide a calling party announcement apparatus that is compatible with Bellcore specifications for data transmission used on Caller ID service and Caller ID with Call Waiting service.

It is a final aspect of the invention to provide a calling party announcement apparatus that allows the subscriber customize the announcement of the calling party's name.

The invention is a calling party announcement apparatus for a telephone system which provides audible identification of incoming calls to subscriber's telephone sets connected to said system. Detecting means, connected between said system and said telephone set, is provided for detecting the caller's identification signals. Central processing means for processing said line identification signal outputs a signal corresponding to the identity of the caller. Isolation means for isolating an engaged telephone set from the telephone company central office switch. Loop current means for establishing a telephone current loop condition to power the s isolated telephone set. Announcing means for transforming the identity signal provided by said central processing means produces and audible signal that announces the caller's identity over a speaker and over the engaged telephone set.

DETAILED DESCRIPTION OF THE INVENTION

Figure 1:
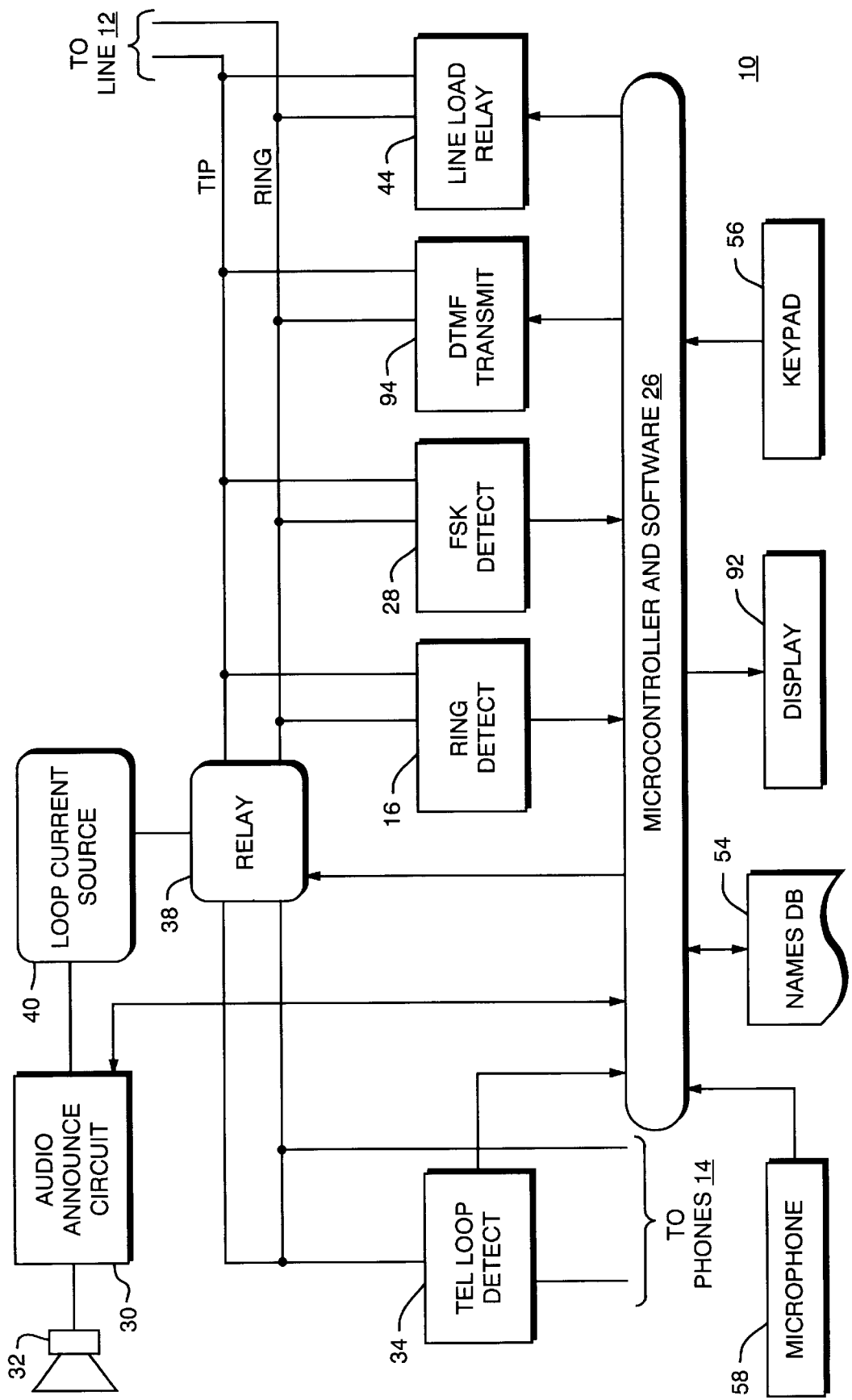
FIG. 1 illustrates a block diagram of the system including all functional components in accordance with the invention.

The invention makes it possible to screen incoming telephone calls. The invention is an improvement over Caller ID-equipped telephone sets, Caller ID display terminals, and telephone-company based call screening subscription services. The invention is installed in the customer premises, such as a residence or office, between the telephone service demarcation point and the telephone sets. The invention is compatible with standard telephone sets, including cordless and speaker telephones. The invention is also compatible with standard analog telephone subscriber trunks. The invention is also compatible with standard Incoming Caller Line Identification "ICLID", which is commonly known as Caller ID. Caller ID is an enhanced subscriber service offered by local telephone companies for a nominal monthly charge.

For an incoming call, the invention captures the ICLID signal during the quiet period following the first ring. The invention converts the ICLID data to an audible signal representative of the caller's identity. This could be the caller's name, or phone number, or even the name of the caller's state (i.e. "New Hampshire"). The caller's identity is announced right away over a built-in speaker, identifying the caller prior to answering a telephone.

After the telephone is answered, the invention announces the caller's name or telephone number over the telephone set by way of a locally generated current source. The telephone company central office is unaware that the telephone was answered and continues to return the ringback indication to the calling party and ring voltage to the subscriber's service demarcation point.

The called party can elect to accept the call by flashing the telephone's hook switch or touching a specific key on the telephone keypad. Once the call is accepted, the caller and called parties are connected and normal telephone operation is restored.

The called party can reject the incoming call by hanging up the telephone. If the call is rejected, and the caller continues to wait for an answer, ringing is restored, but the Caller ID is not announced again. This provides an opportunity for telephone answering devices to accept the call. It also gives the called party another chance to accept the call.

The invention supports identification of incoming calls that arrive while the subscriber's telephone set is engaged with another call. Many telephone users to subscribe to a service called "Call Waiting" for handling incoming telephone calls while the subscriber's telephone set is busy or engaged. On telephone lines provisioned with "Caller ID with Call Waiting" service, the invention detects the Caller ID information following the Call Waiting alerting tone, and identifies the waiting call by announcing the waiting caller's identity over the engaged telephone. Only the called party hears this announcement.

The invention decodes the Caller-ID information according to Bellcore technical documents for Calling Party Name and Number Delivery, and Calling Party Name and Number Delivery with Call Waiting.

No special provisions are necessary at the telephone company central office switching system other than for Bellcore-standard Caller-ID which is now available in generic software packages from all major switching system manufacturers.

A significant technical aspect of the invention is its ability to deliver an audible announcement of the caller's identity over a standard telephone without the call being "answered". The call is not connected nor is it billed by the telephone company until the called party or a telephone answering device, such as an answering machine, accepts the call.

Preventing the telephone company central office from detecting the "off-hook" condition is achieved by isolating the telephone sets from the telephone company central office at precisely the moment the telephone set is engaged. In the preferred embodiment, this is done by energizing a relay that breaks the connection to the central office after the telephone is answered but before the central office has detected the off-hook condition. Clearly, in another embodiment, this invention can take advantage of common provisions, such as the radio frequency (RF) interface in cordless telephones, that physically isolate the remote handset from the telephone network not otherwise intended for purposes of audible off-hook Caller-ID delivery.

While the off-hook telephone is isolated from the telephone company central office, the telephone is connected to a loop current supply internal to the invention. The loop current supply is necessary to power the off-hook telephone set while providing the audible announcement over the receiver.

Recent advances in speech storage and compression techniques make it possible to integrate "off-the-shelf" speech devices to provide the audible announcement of the caller's identity. It is not the aspect of the invention to promote a special speech technology, but rather to be able to take advantage of such generic technology, including text-to-speech technology, as it becomes available.

The power ringing signal is provided directly by the telephone company central office. The invention does not block or regenerate the ring signal. This attribute is particularly important for subscribers of other custom calling services, such as "distinctive ringing". The invention's means for detecting a telephone off-hook condition and isolating the telephone from the telephone company central office is designed specifically so as not to interfere with ringing.

FIG. 1 illustrates a block diagram of the system including all functional components in accordance with the invention. Invention 10 is connected to the telephone network at connection point 12, typically an RJ-11 "modular" telephone jack common to most telephones. All telephone sets served by the invention are connected at point 14, also typically an RJ-11 jack. While in the idle or power-down state, double pole double throw relay 38 is in the position that connects the Tip and Ring leads at point 12 to the Tip and Ring leads at point 14. While the unit is under power, the state of relay 38 is under microcontroller 26 software control. Microcontroller 26 is a general purpose programmable embedded microcontroller such as an Intel 8051 and includes the software stored in ROM. Microcontroller 26 has links to telephone loop detector 34, ring detector 16, FSK decoder 28, DTMF transmitter 94, microphone 58, keypad 56, relay 38, pre-loading circuit 44, announcement circuit 30, LCD display 92, and database 54. Database 54 contains audio records keyed to ICLID numbers. Database 54 is stored in non-volatile RAM or "Flash" memory accessed by microcontroller 26.

The telephone central office alerts the device to an incoming call by applying either a ring voltage to Tip and Ring leads at point 12, or transmitting an alerting tone used for Call Waiting. Ring detector 16 detects the ring voltage and alerting tone as it is applied by the telephone central office and indicates such to microcontroller 26. In the preferred embodiment, Ring Detector 16 consists of a Siemens model H11AA1 opto-isolator for detecting bi-phase power ringing, and a MITEL model MT8843 call waiting detector for detecting the new call alerting tone.

FSK Decoder 28 detects frequency shift keyed (FSK) signals present at the Tip and Ring leads at point 12 (connected to the telephone central office). The FSK data contains the ICLID information transmitted from the telephone central office. The FSK data from the output of decoder 28 is presented to microcontroller 26. MITEL's MT8843 is preferably used as decoder 28.

Keypad 56 is provided for the user interface. In the preferred embodiment, keypad 56 is a series of four tactile keys used for selecting programming modes, recording audio to corresponding caller id records, and reviewing calls stored in a call log.

Microphone 58 is used for receiving audio signals to be stored by the microcontroller and associated with corresponding caller id records. In the preferred embodiment, microphone 58 is an electret microphone.

DTMF transmitter 94 transmits Dual Tone Multiple Frequency (DTMF) signals onto the Tip and Ring leads at point 12 (connected to the telephone central office). The DTMF signal transmitted from the analog output of transmitter 94 is controlled by microcontroller 26, and is used for interacting with telephone company central office switching system protocols used during Caller ID on Call Waiting. Mitel's model MT-8888 is preferably used as transmitter 94.

Loop detector 34 detects the presence of loop current through the telephone sets. The output of detector 34 is presented to microcontroller 26. Siemens model H11AA1 is preferably used for loop detector 34.

Announcement circuit 30 supplies a small signal announcement into current source 40 and to speaker 32. Announcement circuit 30 is controlled by microcontroller 26. Announcement circuit 30 is factory-programmed with static prompts representing the numbers 0–9, phrases "number unknown" and "number blocked", as well as the names of the fifty US States. Each of these announcements, as well as announcements to be recorded by the user, can be individually addressed by microcontroller 26. Information Storage Devices' model ISD2575 is preferably used along with an audio amplifier LM386 for announcement circuit 30.

Current source 40 amplifies the audio signal for playing the caller's identity into relay 38 for announcement over the telephone sets attached at point 14. Current source 40 is preferably an current source LM317 biased to provide a nominal 28 mA of current through an off-hook telephone set attached at point 14.

Loading circuit 44 is used to hold the primary call stable while call waiting calls are audibly identified over telephone sets attached at point 14. In the preferred embodiment, a high voltage transistor such as MPSA42 is used to selectively engage the line at point 12 by sinking 28 mA from the telephone line.

Figure 2:
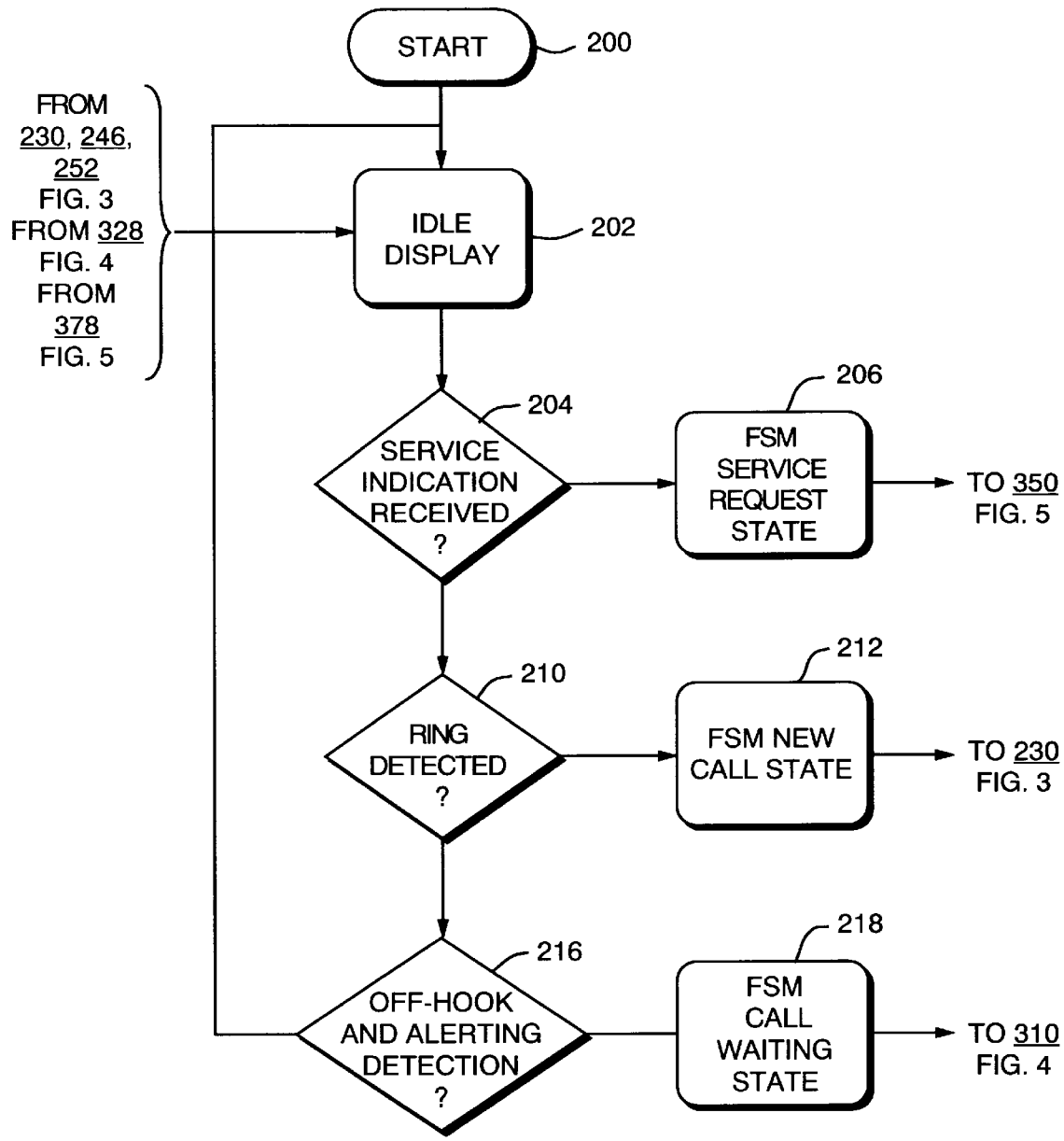
FIG. 2 is a flow chart showing the microcontroller processing software in the MAIN routine.

FIG. 2 illustrates the main software process executed by microcontroller 26. A Finite State Machine (FSM) process is used to control the invention. The primary states of the FSM are STARTUP, SERVICE, NEW CALL, and CALL WAITING states.

Process 200 is a startup routine for the selected microcontroller 26 used to set up interrupt vectors, serial modes, and hardware configuration. Process 200 is entered following power-up or reset of the invention and sets the FSM to the STARTUP state. Execution continues to process 202. Relays 38 and 44 are deenergized. Dynamic call records are initialized and elements about the last call are preserved. The number of calls stored in a call log, along with the local time and date, is displayed on an attached LCD display 92.

Process 204 monitors the status of keypad 56. When a service request is made by the user by pressing any of the keys, execution branches to process 206 where the FSM transitions to SERVICE state and branches to process 350. Otherwise execution continues at process 210. Process 210 checks the result of polling ring detector 16 for a new call indication. A new call is indicated when detector 16 detects a power ring signal, whereby execution branches to process 212 where the FSM transitions to the NEW CALL state and branches to process 230. Otherwise, execution continues at process 216. Process 216 checks the result of polling ring detector 16 for a call waiting indication. A call waiting is indicated when detector 16 detects an alerting tone, whereby execution branches to process 218 where the FSM transitions to the CALL WAITING state and branches to process 300. Otherwise, execution loops back to process 202.

Figure 3:
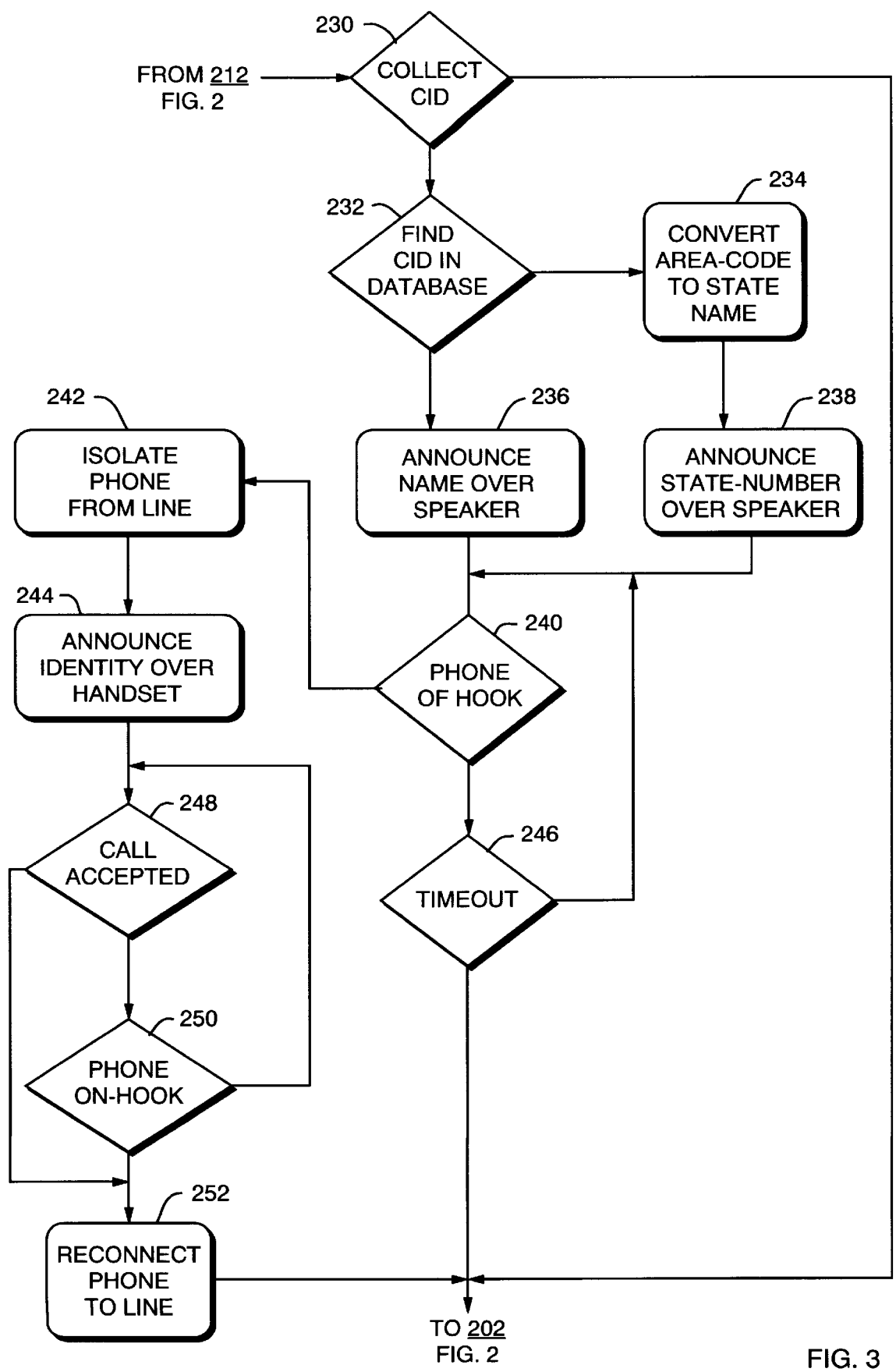
FIG. 3 is a flow chart showing the microcontroller processing software for handling NEW CALL calls.

FIG. 3 illustrates the NEW CALL state process. The process begins at 230 where the ICLID signal is collected by FSK detector 28 and the data sent to microcontroller 26 for storage in the call log of database 54. Process 232 searches database 54 for a match to the collected ICLID number. Database 54 contains audio information keyed with an ICLID number or a group of ICLID numbers. If the ICLID data is not provided by the telephone company or the ICLID number is blocked by the calling party, microcontroller 26 identifies the calls as "number unknown" or "number blocked" respectively. Process 232 branches based on the status of the search through database 54. If the search returned a zero value, execution branches to process 234, where the area-code from the ICLID number is cross-referenced with the name of a state and at process 238 microcontroller 26 directs announcement circuit 30 to speak the name of the state and the ICLID number, typically the caller's telephone number. If the database 54 search was successful, execution branches to process 236 and microcontroller 26 directs announcement circuit 30 to speak the audio returned from the search. Process 240 checks the state of loop detector 34 for an off-hook condition. If an off-hook condition is detected before process 246 determines a timeout, processing jumps to 242. If a timeout is detected, processing jumps back to 202. Process 242 isolates the off-hook phone from the line by engaging relay 38 and applying loop current 40. Process 244 causes circuit 30 to announce the caller's identity over the off-hook telephone set. Processes 248 and 250 look for the call to be accepted with a hook-flash or rejected with a hang-up by checking loop detector 34 before disengaging relay 38 and re-establishing connection to the line at process 252. Finally, control is returned back to process 202.

Figure 4:
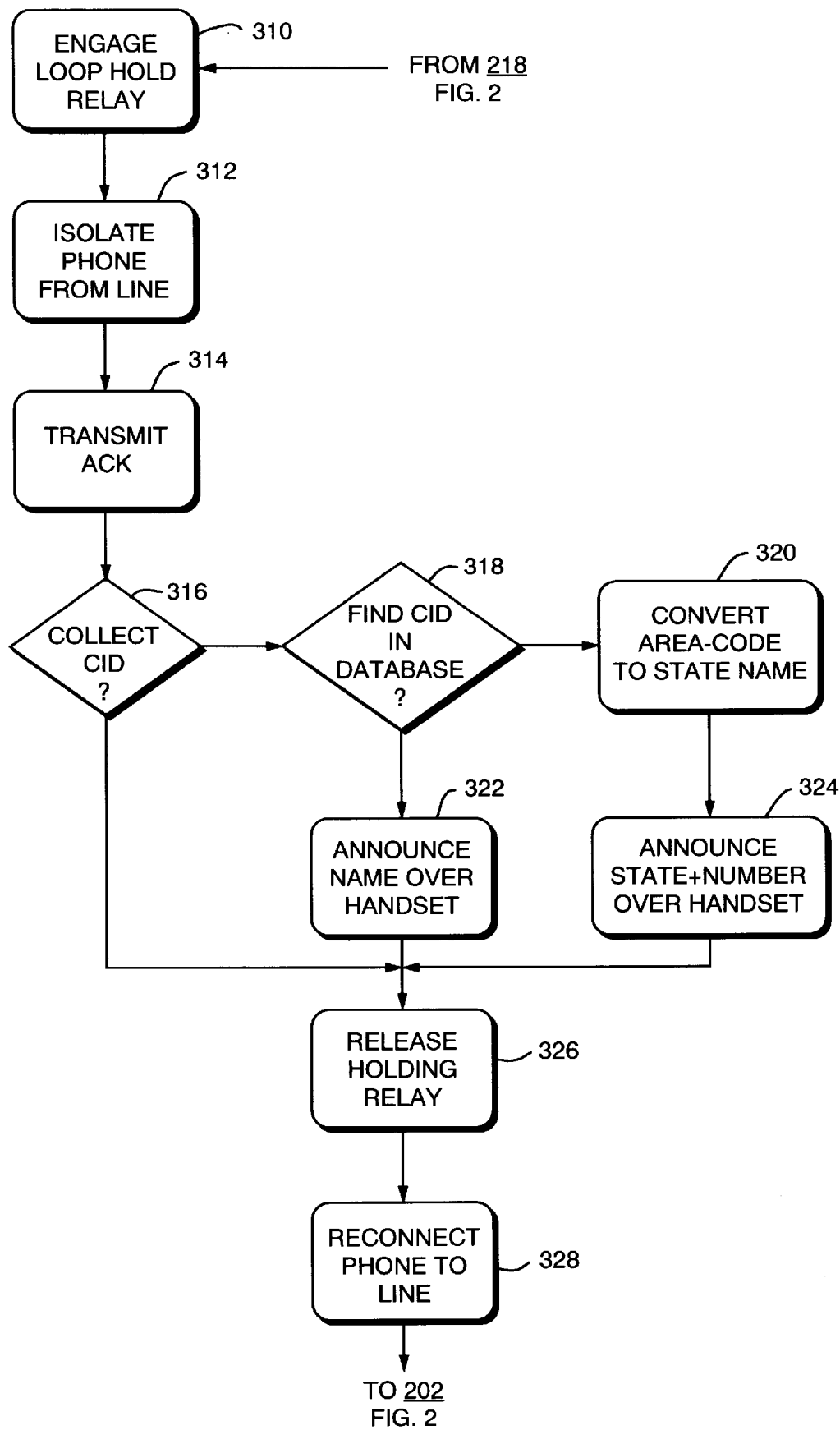
FIG. 4 is a flow chart showing the microcontroller processing software for handling CALL WAITING calls.

FIG. 4 illustrates the CALL WAITING state process. The process begins at 300 after detecting the alerting tone, by engaging load relay 44 to hold the line offhook at process 310 and then engaging isolation relay 38 in process 312. In process 314, an ACK tone (typically DTMF-D) is transmitted back down the line towards the telephone company switch to indicate that the device is ready to receive ICLID data. In process 316, ICLID signal is collected by FSK detector 28 and the data sent to microcontroller 26 for storage in the call log of database 54. Process 318 searches database 54 for a match to the collected ICLID number. Database 54 contains audio information keyed with an ICLID number or a group of ICLID numbers. If the ICLID data is not provided by the telephone company or the ICLID number is blocked by the calling party, microcontroller 26 identifies the calls as "number unknown" or "number blocked" respectively. Process 318 branches based on the status of the search through database 54. If the search returned a zero value, execution branches to process 320, where the area-code from the ICLID number is cross-referenced with the name of a state and at process 324 microcontroller 26 directs announcement circuit 30 to speak the name of the state and the ICLID number, typically the caller's telephone number. If the database 54 search was successful, execution branches to process 322 and microcontroller 26 directs announcement circuit 30 to play the audio returned from the search over the off-hook telephone. Process 326 releases loading relay 44 after the announcement concludes. Processes 328 disengages relay 38 and re-establishes conversation with the primary caller. Finally, control is returned back to process 202.

Figure 5:
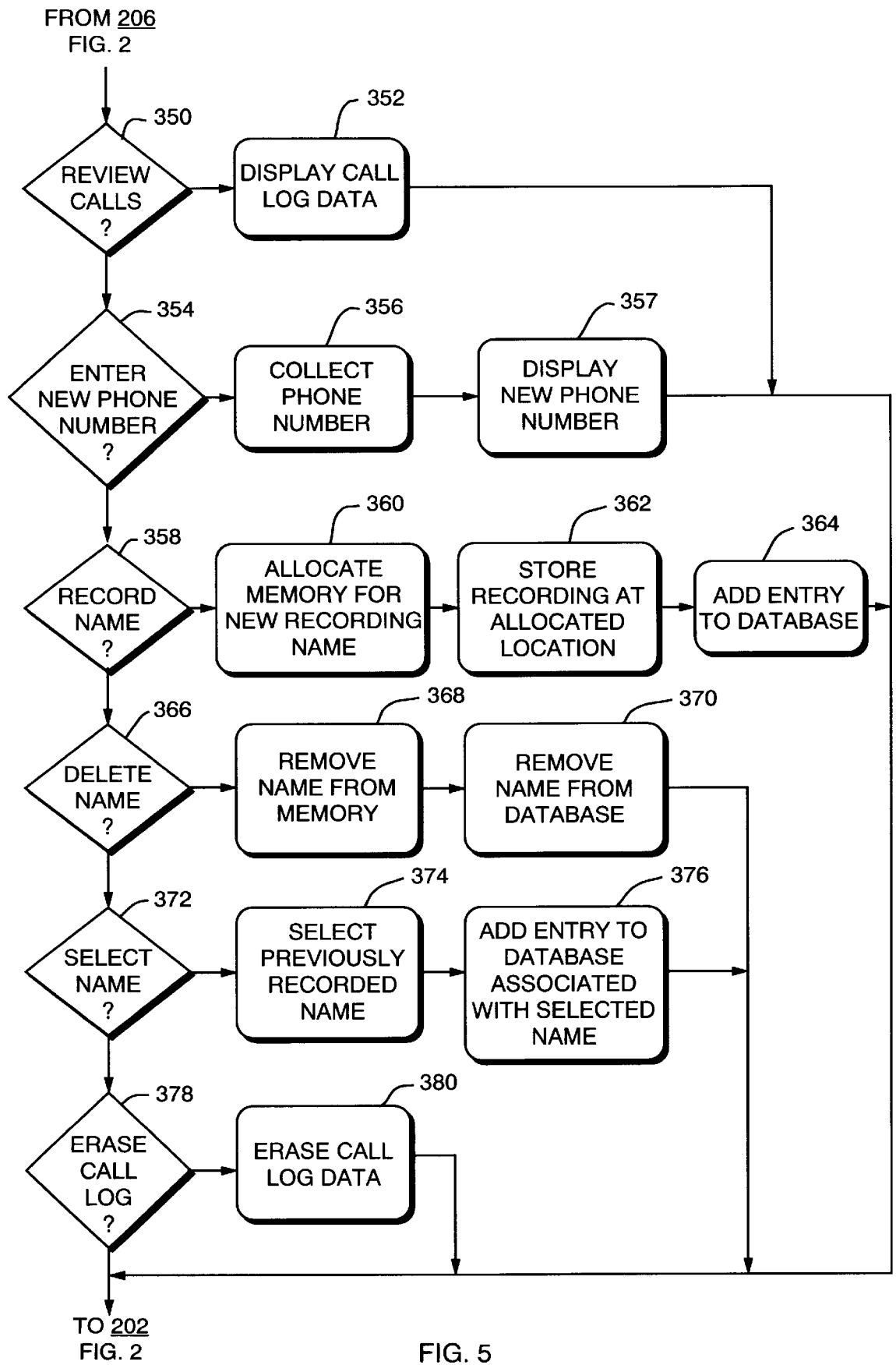
FIG. 5 is a flow chart showing the microcontroller processing software for SERVICE, such as adding a caller to the name database.
Figure 6:
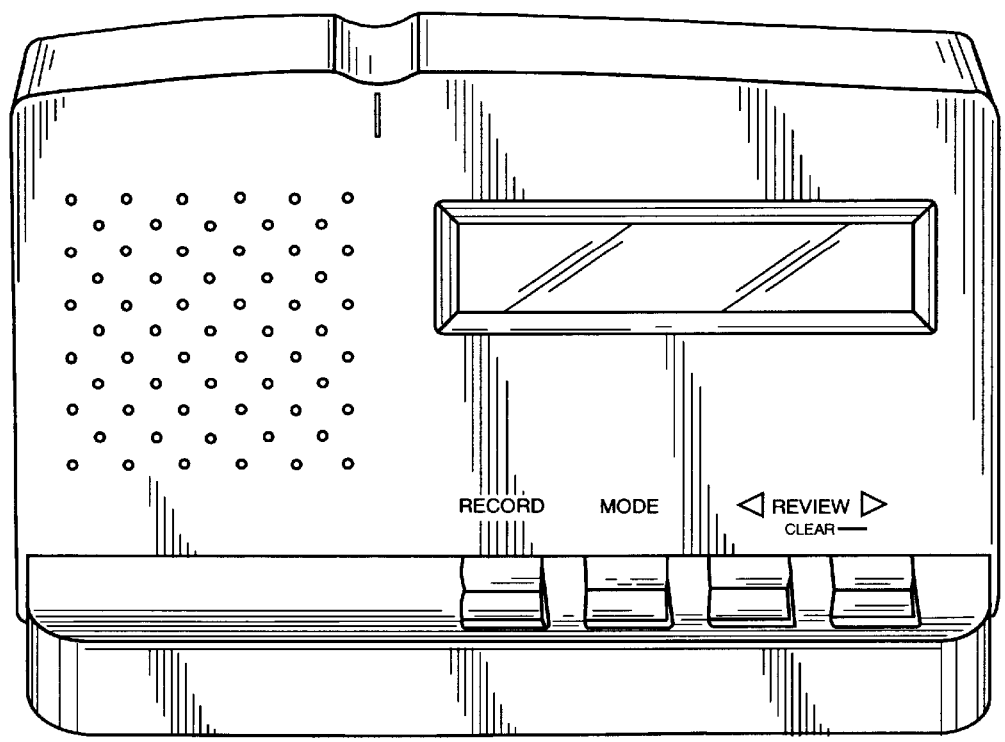
FIG. 6 is a rendering of the invention shown in its housing.

FIG. 5 illustrates the SERVICE state processes. The SERVICE processes are used to add audio announcements to the database, erase audio announcements, select previously recorded announcements to be associated with a new telephone number, review the call log, erase the call log, and to manually enter a telephone number for further recording.

Process 350 checks keypad 56 for review call log requests. Execution jumps to process 352 to review calls in the log by recalling call log information from database 54 and displaying the call log information on display 92. Execution then returns to process 202. Process 354 checks keypad 56 for manual entry requests. Execution jumps to process 356 where the phone number is collected using keypad 56. At process 357, the entered number is displayed on display 92. Execution then returns to process 202.

Process 358 checks keypad 56 for record name requests. Execution jumps to process 360 where microcontroller 26 allocates memory in database 54 for storing an audio recording to be associated with the presently displayed ICLID information. Process 362 enables microphone 58 to receive the audio signal and record the audio signal in the allocated memory. Process 364 then adds a record to database 54 that keys the displayed ICLID information with the address of the newly recorded audio. Execution then returns to process 202.

Process 366 checks keypad 56 for delete name requests. Execution jumps to process 368 where microcontroller 26 searches database 54 for stored audio associated with the presently displayed ICLID information. Process 370 erases the database reference to the displayed ICLID information. Execution then returns to process 202.

Process 372 checks keypad 56 for select name requests. Execution jumps to process 374 where the user selects from previously recorded audio to be associated with the presently displayed ICLID information. Process 376 directs microcontroller 26 to add a database record associating the displayed ICLID information with the selected audio recording. This processing enables multiple telephone numbers to be associated with the same audio recording. Execution then returns to process 202.

Process 378 checks keypad 56 for erase call log requests. Execution jumps to process 380 where microcontroller 26 clears the call log data stored in database 54 and the call log counter is set to zero. Execution then returns to process 202.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A calling party announcement apparatus for a telephone system which provides caller identification signals to a subscriber's telephone equipment connected to the telephone system, said apparatus comprising:

detecting means, connected to the telephone system, for detecting the caller's identification signal;

central processing means, connected to said detecting means, for processing said identification signal to output a signal corresponding to the identity of the caller;

isolation means, interconnected with said central processing means, for isolating said telephone equipment from the telephone system;

reconnection means, interconnected with said central processing means, for reconnecting said telephone equipment to the telephone system; and loop current means, in communication with said isolation means and an announcing means, for providing power to said telephone equipment while said telephone equipment is isolated from the telephone system; and said announcing means, connected to said central processing means, for transforming the identity signal provided by said central processing means to produce an audible signal that announces the caller's identity.

2. The calling party announcement apparatus of claim 1 further comprises speech synthesizing means for providing the caller's telephone number in synthesized human speech.

3. The calling party announcement apparatus of claim 1 further comprising speech synthesizing means for providing the caller's state of origin name in synthesized human speech.

4. The calling party announcement apparatus of claim 3 wherein said central processing means further comprises memory storage for providing a signal to said announcement means that corresponds to the name of the calling party.

5. The calling party announcement apparatus of claim 4 wherein said memory storage means further comprises address input means for adding, deleting, and editing names and corresponding telephone numbers.

6. The calling party announcement apparatus of claim 4 wherein said memory storage means further comprises multiple association means for associating a single name with multiple corresponding telephone numbers.

7. The calling party announcement apparatus of claim 4 wherein said announcement means provides the caller's name in synthesized human speech.

8. The calling party announcement apparatus of claim 4 wherein said apparatus are components of said subscriber's telephone equipment.

9. The calling party announcement apparatus of claim 4 wherein said apparatus are components of a cordless telephone set.

10. The calling party announcement apparatus of claim 4 wherein said apparatus are components of a computer modem.

11. The calling party announcement apparatus of claim 4 wherein said apparatus are components of a computer-telephony interface board.

12. The calling party announcement apparatus of claim 4 wherein said apparatus are components of a telephone answering device.

13. The calling party announcement apparatus of claim 4 wherein said apparatus is interconnected to a plurality of telephone sets served by said telephone system.

14. The calling party announcement apparatus of claim 1 further comprising:

hookflash means, in communication with said isolation means and said reconnection means, for sending a hookflash to the telephone system.

* * * * *